UNITED STATES PATENT OFFICE.

THOMAS MARRIN, OF SIVERLYVILLE, PENNSYLVANIA.

IMPROVEMENT IN PURIFICATION OF PARAFFINE-OILS.

Specification forming part of Letters Patent No. 211,762, dated January 28, 1879; application filed June 20, 1878.

*To all whom it may concern:*

Be it known that I, THOMAS MARRIN, of Siverlyville, in the county of Venango and State of Pennsylvania, have invented certain new and useful Improvements in the Art of Manufacturing Paraffine; and I do hereby declare that the following is a full, clear, and exact description thereof, which will enable others skilled in the art to which it appertains to make and use the same.

In refining petroleum sulphuric acid is used to "treat" the distillate, after which treating the acid mixed with the impurities settles to the bottom of the agitator and is drawn off. It is then "spent," and is called "sludge acid." It is of but trivial value and often goes to waste, though it can be made over into commercial acid, and it is sometimes utilized in the manufacture of fertilizers.

In the present method of separating paraffine wax from oil, the dark-green distillate from the tar-stills is artificially frozen and pressed, and the wax which remains after such pressure is melted and treated with sulphuric acid, and washed until all the impurities are entirely removed.

In my improved process I clarify such paraffine-oil and remove the most of its impurities before congealing it, and this I do in the following way: I heat such oil sufficiently to make it perfectly limpid, and treat it with said sludge acid, agitating it thoroughly, precisely as illuminating-oil is treated and agitated with sulphuric acid.

It is impossible to give a fixed rule for the quantity of sludge acid to be employed, as it will vary according to the condition of the oil and the strength of the sludge acid. On an average about five carboys of the sludge acid will be employed for one hundred barrels of the oil; but the result must be tested from time to time, the same as in the treatment of illuminating-oil, until the desired result is obtained, and more sludge acid can be added if the first application is not sufficient. After sufficient agitation I allow it to settle, and at the top there will be a bright amber paraffine-oil, which should be separated from the sediment, thoroughly washed with warm water, (the hotter the better,) and the sludge acid still remaining therein neutralized with alkali. The washings resulting from neutralizing the illuminating-oil will be strong enough for this.

Warm water should be used for washing, so as not to chill the oil; and until the process is completed the oil must be kept so warm that it will not solidify.

The paraffine-oil thus obtained is suitable for freezing and pressing, and contains a greater percentage of wax, and will congeal at a higher temperature than the unclarified oil, and the wax will be whiter, contain less impurities, and require less acid and less manipulation for its perfect cleaning than that obtained in the ordinary way.

By my process I effect an economy in labor and chemicals, and utilize what is now almost worthless.

The paraffine-oil which I have mentioned is the dark-green distillate from the tar-stills, and is of a gravity of from 10° to 40° Baumé, at a temperature of 60° Fahrenheit.

I am aware that sulphuric acid has heretofore been mixed with liquid paraffine to purify it, and the sole object of my invention is to produce the same result by more economical means, by a product formerly wasted and considered worse than useless.

What I claim as my invention is—

In the art of obtaining paraffine-wax, clarifying the paraffine-oil before congelation with sludge acid, by mixing and agitating the two, decanting the paraffine, washing it with warm water, and neutralizing any residuary acid with alkali, substantially in the manner and for the purpose described.

THOMAS MARRIN.

Witnesses:
JAMES C. BOYCE,
WM. H. DUFUR.